United States Patent
Krausz et al.

(10) Patent No.: US 9,441,773 B2
(45) Date of Patent: Sep. 13, 2016

(54) PIPE CLAMP WITH SELF-ALIGNING MECHANISM WHILE CLOSIING OF SAME

(75) Inventors: Eliezer Krausz, Tel Aviv (IL); Avi Chiproot, Kfar-Saba (IL)

(73) Assignee: Eliezer Krausz Industrial Development Ltd., Tel Aviv (IL)

( * ) Notice: Subject to any disclaimer, the term of this patent is extended or adjusted under 35 U.S.C. 154(b) by 1324 days.

(21) Appl. No.: 12/997,880

(22) PCT Filed: May 13, 2009

(86) PCT No.: PCT/IL2009/000483
§ 371 (c)(1),
(2), (4) Date: Dec. 14, 2010

(87) PCT Pub. No.: WO2009/138982
PCT Pub. Date: Nov. 19, 2009

(65) Prior Publication Data
US 2011/0095519 A1    Apr. 28, 2011

(30) Foreign Application Priority Data
May 14, 2008 (IL) .......................................... 191447

(51) Int. Cl.
*F16L 33/04* (2006.01)
*F16L 21/06* (2006.01)

(52) U.S. Cl.
CPC .............. *F16L 33/04* (2013.01); *F16L 21/065* (2013.01)

(58) Field of Classification Search
USPC ................. 285/252–253, 365, 407, 420–421
See application file for complete search history.

(56) References Cited

U.S. PATENT DOCUMENTS

| | | | |
|---|---|---|---|
| 684,582 A * | 10/1901 | McGuire ........................ | 285/114 |
| 746,497 A * | 12/1903 | Greenfield ................. | 285/222.2 |
| 930,933 A * | 8/1909 | Brodie ............................ | 285/71 |
| 1,731,320 A * | 10/1929 | Ratcliffe ......................... | 285/18 |
| 3,251,615 A * | 5/1966 | Short, III ....................... | 285/112 |
| 3,432,190 A * | 3/1969 | Kunz ............................. | 285/253 |
| 3,966,237 A * | 6/1976 | Thiessen ....................... | 285/112 |
| 4,789,189 A | 12/1988 | Robertson | |
| 5,161,836 A * | 11/1992 | McKinnon .................... | 285/373 |
| 6,626,466 B1 | 9/2003 | Dole | |
| 6,830,268 B2 | 12/2004 | Krausz et al. | |
| 2003/0178850 A1* | 9/2003 | Dole et al. ..................... | 285/420 |

* cited by examiner

Primary Examiner — Aaron Dunwoody
Assistant Examiner — Fannie Kee
(74) Attorney, Agent, or Firm — Dekel Patent Ltd.; David Klein

(57) ABSTRACT

An annular band is adapted for wrapping around an outer diameter of a pipe. The band has two end members including tightening fasteners, which when tightened together, tighten the and against the pipe. The end members include alignment elements that mate with each other upon tightening of the tightening fasteners. The alignment elements axially align the end members with each other.

4 Claims, 4 Drawing Sheets

PIPE CLAMP WITH SELF-ALIGNING MECHANISM WHILE CLOSIING OF SAME

FIELD AND BACKGROUND OF THE INVENTION

The present invention relates to a pipe clamp.

More particularly, the invention provides an improved external clamp for use on pipes, provided with a self-aligning mechanism.

Pipes can be economically clamped or coupled by a metal band clamp. One of the advantages of his type of clamp is that it can be assembled to a pipeline even where no access is available to the pipe end. The present inventors have received patents for various types of band clamp, and production of said clamps has been commercially successful.

The clamp in the prior, art is substantially wedge shaped with rounded corners. In order to clamp correctly the two extremities or lips of the clamp need to be in line contact, and not one beneath the other. This simple-sounding requirement has however proved to be surprisingly difficult to achieve in practice. No relevant prior art was found.

In the course of engineering research carried out by the inventors several configurations were tested. An example of an unsatisfactory design which was tested is seen in FIG. 1, showing one of a plurality of rivet-shaped locator pins arranged to enter corresponding recesses. On test it was found that the components were too small to correct the degree of misalignment often found in this type of clamp, and so did not achieve the desired lip alignment. The results did however indicate that a larger locating device as disclosed in the present patent application might be, and was successful.

OBJECTS OF THE INVENTION

It is therefore one of the object of the present invention to obviate the disadvantages of the prior art band clamp and to provide an arrangement which would ensure proper lip alignment.

SUMMARY AND PREFERRED EMBODIMENTS OF THE INVENTION

The present invention achieves the above object by providing a self-aligning means particularly useful in combination with a band pipe clamp or a band pipe coupling, said means comprising first and second rounded wedge-like shapes, the wedge base of the two shapes being disposed at an acute angle to each other when installed, the rounded wedge tips being in contact with each other, the metal band of said pipe coupling or clamp, when tightened by at least one screw fastener reducing said acute angle between the bases of said wedge-like shapes, said wedge like position being provided with at least one aperture allowing passage for at least one screw fastener therethrough, said first rounded wedge-like shape being provided with at least one alignment projection, having a width of at least 20% of the base length, said projection extending from the wedge base surface of said first rounded wedge-like shape, and said second of said rounded wedge-like shapes being provided with at least one recess, corresponding in position and substantially also in shape to said at least one alignment projection.

In a preferred embodiment of the present invention there is provided a clamp unit wherein said first and said second rounded wedge-like shapes form the extremities of a complete pipe seal arrangeable to encircle and seal a pipe joint or fault.

In another preferred embodiment of the present invention there is provided a clamp wherein said at least one alignment projection is made of a metal.

In a further preferred embodiment of the present invention there is provided a clamp wherein said at least one alignment projection is made of a tough and strong polymer.

In a further preferred embodiment of the present invention there is provided a clamp wherein said alignment projections are pivotably attached to said first rounded wedge-like shape.

In a most preferred embodiment of the present invention there is provided a clamp wherein said first rounded wedge-like shape is provided with a plurality of spaced-apart said alignment projections.

It will thus be realized that the novel device of the present invention serves to align the wedge lips in the vertical planes. In embodiments provided with two or more aligning devices the lips of the clamp are aligned also to be parallel to each other. The effects of clamp tightening and the degree of misalignment of the lips are difficult to prove theoretically, even with the use of a modem 3 dimensional computer model. The reason for this is that in theory no forces exist to cause misalignment. However the disclosure in the present invention is a result of a procedure of several cycles of testing and redesign which resulted in a satisfactory product.

SHORT DESCRIPTION OF THE DRAWINGS

The invention will now be described further with reference to the accompanying drawings, which represent by example preferred embodiments of the invention. Structural details are shown only as far as necessary for a fundamental understanding thereof. The described examples, together with the drawings, will make apparent to those skilled in the art how further forms of the invention may be realized.

FULL DISCLOSURE OF THE INVENTION

Figure 1:
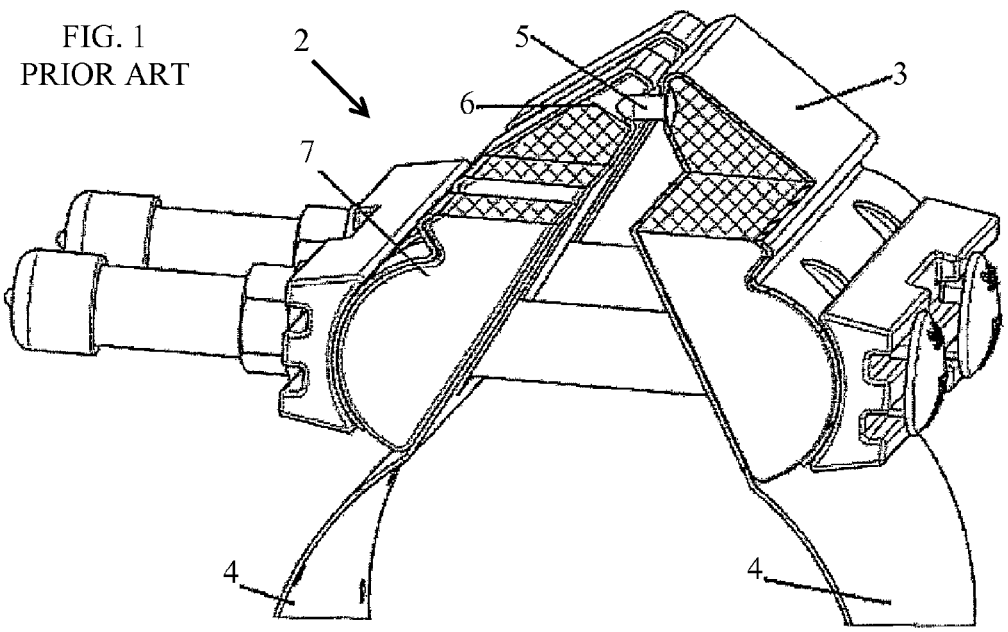
FIG. 1 is a perspective, partially sectioned view of a prior-art pipe clamp.

Seen in FIG. 1 is a prior art pipe clamp 2 intended to be self aligning. In a first side 3 of the band clamp 4 a series of rivet-like projections 5 are aligned with a series of in-line recesses 6 in the opposite side 7 of the clamp. A prototype was constructed accordingly and on test it was found that some or all projections 5 did not enter the recesses 6 where noticeable distortion of the clamp needed to be corrected.

Figure 2:
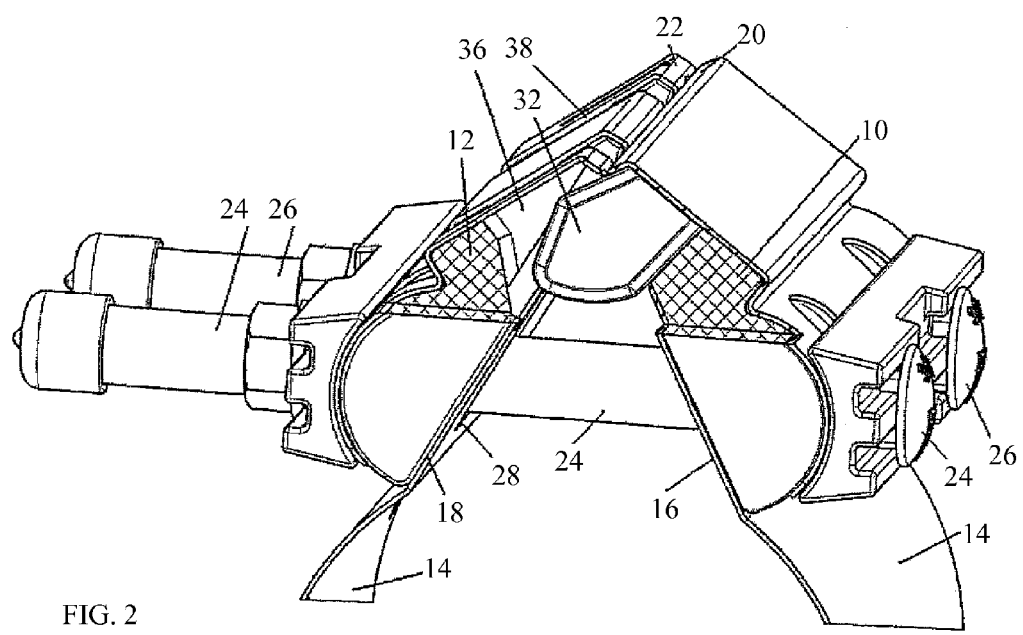
FIG. 2 is a perspective, partially sectioned view of a preferred embodiment of the pipe clamp according to the invention.

There is seen in FIG. 2 a self-aligning metal clamp band 14 having two wedge like ends 10 and 12.

The flat wedge bases 16, 18 of the two shapes are disposed at an acute angle to each other when installed, and the rounded wedge tips 20, 22 are in contact with each other. The metal clamp band 14, encircles a pipe. During tightening of the band 14 by two or more screw fasteners 24, 26 shown in the figure, the acute angle between the bases 16, 18 of the wedge-like shapes 10, 12 is gradually reduced.

The clamp shown is provided with two apertures or slots 28, only one of which is visible in the drawing, allowing passage for two screw fasteners 24, 26 therethrough. The first rounded wedge-like shape 10 is provided with two or more spaced-apart alignment projections 32. The width of the projections 32 is about 25% of the base 16, 18 in length. The projections 32, only one of which is visible in the drawing, extend outwardly towards from the base 16 of the first wedge 10 to the base 18 of the opposite second wedge 12. The preferred shape of the alignment projections 32 include a blunt arrow shape 48 pointing outwardly. The alignment projections 32 are firmly held by the rounded wedge-like shape 10. The alignment projection 32 may suitably be made of a metal such as stainless steel. The second of the rounded wedge-like shapes 12 is provided with two recesses 36, 38, corresponding in position and substantially also in shape to the alignment projections 32.

With reference to the rest of the figures, similar reference numerals have been used to identify similar parts.

Figure 3:
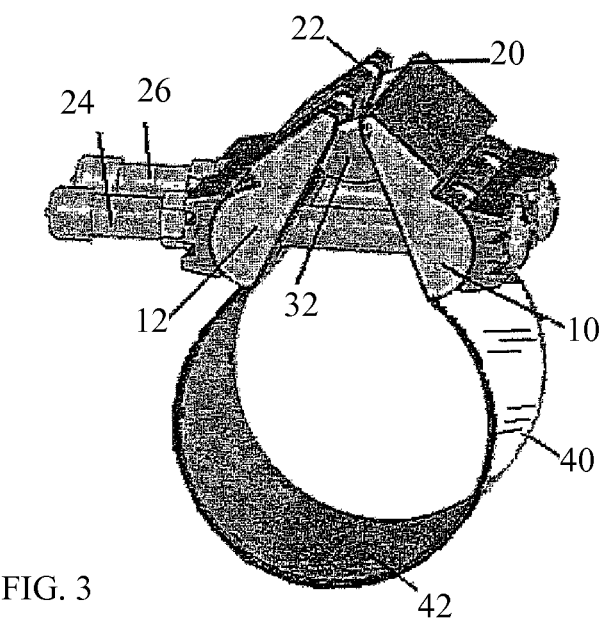
FIG. 3 is a perspective view of an embodiment wherein the pipe clamp is a complete unit and FIG. 4 is a perspective, fragmented, partially sectioned view of a preferred embodiment of the seal according to the invention.

Referring now to FIG. 3 there is seen a clamp 40 wherein the first 10 and the second 12 rounded wedge-like shapes form the extremities of a complete clamp 40. The clamp 40 is arrangeable to encircle and seal a pipe joint or fault. This type of seal extends through the gap formed between the two extremities of the metal band 40 used to apply pressure to the seal unit 42.

Figure 4:
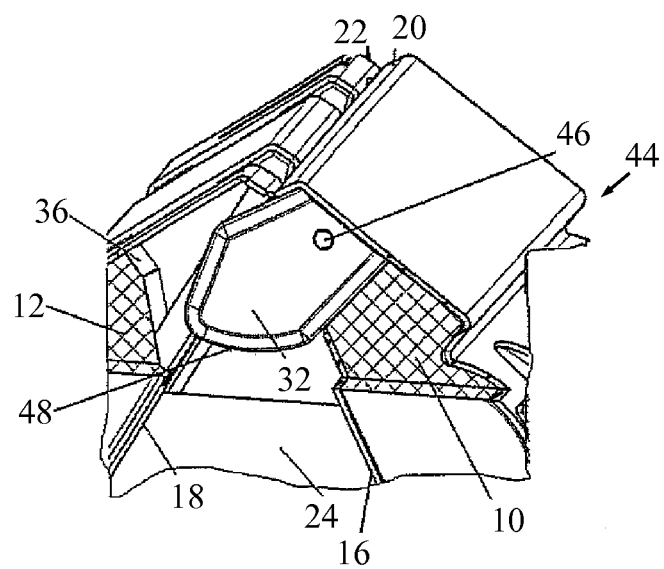

Seen in FIG. 4 is a seal unit 44 wherein the alignment projections 32 are pivotably attached 46 to the first rounded wedge-like shape 10. This type of attachment is easier to enter into the recesses 36, 38 in the second rounded wedge-like shape 12.

The scope of the described invention is intended to include all embodiments coming within the meaning of the following claims. The foregoing examples illustrate useful forms of the invention, but are not to be considered as limiting its scope, as those skilled in the art will be aware that additional variants and modifications of the invention can readily be formulated without departing from the meaning of the following claims.

We claim:
1. A pipe clamp comprising:
   first and second clamping members, each of which comprises a convex, outwardly facing surface and a flat inwardly facing surface, said first and second clamping members extending from a band member placeable around a pipe;
   first and second fastener plates having inwardly facing concave surfaces that abut against said convex, outwardly facing surfaces of said first and second clamping members, respectively;
   fasteners that pass through apertures formed in said first and second clamping members and apertures formed in said first and second fastener plates, each of said flat inwardly facing surfaces forming an acute angle with a longitudinal axis of each of said fasteners;
   first and second wedge portions extending respectively from said first and second clamping members in a direction away from said fasteners;
   at least one alignment projection extending from said first wedge portion and facing towards at least one of said fasteners; and
   at least one recess formed in said second wedge portion aligned with said at least one alignment projection so that after tightening of said fasteners, said at least one alignment projection is received in said at least one recess;
   wherein said at least one alignment projection comprises two straight sides from which extend slanted sides that terminate in a common rounded extremity, all of the straight and slanted sides being formed with rounded edges.

2. The clamp as claimed in claim 1, wherein said slanted sides are curved convexly outwards.

3. The clamp according to claim 1, wherein at least one of said alignment projections is pivotably attached to one of said wedge portions.

4. The clamp according to claim 1, wherein a width of said at least one alignment projection is 25% of a length of a base of one of said wedge portions.

\* \* \* \* \*